United States Patent [19]

Iwabuchi

[11] Patent Number: 5,602,691
[45] Date of Patent: Feb. 11, 1997

[54] MAGNETIC DISK DRIVE APPARATUS USING CONTACT START/STOP MODE AND HEAD LOAD/UNLOAD MODE

[75] Inventor: Masanori Iwabuchi, Ibaragi, Japan

[73] Assignee: NEC Corporation, Tokyo, Japan

[21] Appl. No.: 486,230

[22] Filed: Jun. 7, 1995

Related U.S. Application Data

[63] Continuation of Ser. No. 70,918, Jun. 4, 1993, abandoned.

[30] Foreign Application Priority Data

Jun. 4, 1992 [JP] Japan ................................. 4-143857

[51] Int. Cl.$^6$ ................................................ G11B 21/02
[52] U.S. Cl. ......................... 360/75; 360/74.1; 360/77.02
[58] Field of Search ........................ 360/105, 75, 77.02, 360/97.01, 73.03, 69, 71, 73.01, 74.1

[56] References Cited

U.S. PATENT DOCUMENTS

| | | | |
|---|---|---|---|
| 4,985,793 | 1/1991 | Anderson | 360/105 |
| 5,095,395 | 3/1992 | Wakatsuki | 360/105 |
| 5,144,504 | 9/1992 | Kitazawa | 360/69 X |
| 5,157,560 | 10/1992 | Kanda et al. | 360/73.03 X |
| 5,170,300 | 12/1992 | Stefansky | 360/105 |
| 5,296,986 | 3/1994 | Morehouse | 360/75 X |
| 5,402,200 | 3/1995 | Shrinkle et al. | 360/69 |

Primary Examiner—Andrew L. Sniezek
Attorney, Agent, or Firm—Sughrue, Mion, Zinn, Macpeak & Seas

[57] ABSTRACT

A magnetic disk drive apparatus includes a data storage medium, a magnetic head, an arm assembly, and a magnetic head retracting mechanism. The arm assembly includes a voice coil motor for driving the magnetic head. The magnetic head retract mechanism includes a lifter for moving the magnetic head from an area over the data storage medium in a first start/stop mode or a head load/unload mode and a retract magnet constantly urging the magnetic head towards a contact start/stop zone on the data storage medium in a second start/stop mode or a contact start/stop mode. When the data storage medium starts or stops its rotation, the magnetic head retracting mechanism makes use of a head load/unload mode wherein the data storage medium is caused to be started or stopped while the magnetic head is retracted and separated from the data storage medium, and also makes use, in combination therewith, of a contact start/stop mode wherein the data storage medium is caused to be started or stopped while the magnetic head slides on the data storage medium. Since the two modes are used in combination, this makes it possible to avoid the problems arising from the repeated starts/stops of the medium necessitated by the employment of the semi-stop mode and also makes it possible to reduce the power consumed during the starting of the medium.

9 Claims, 3 Drawing Sheets

MAGNETIC DISK DRIVE APPARATUS USING CONTACT START/STOP MODE AND HEAD LOAD/UNLOAD MODE

This is a Continuation of application Ser. No. 08/070,918 filed Jun. 4, 1993 now abandoned.

BACKGROUND OF THE INVENTION (1) Field of the Invention

The present invention relates to a magnetic disk device, and more particularly to a magnetic disk drive apparatus in which a Contact Start Stop Mode (hereinafter abbreviated as "CSS mode") and a Head Load/Unload Mode (hereinafter abbreviated as "HLU mode") are combined for ensuring a longer life and enhancing reliability of the device. In the CSS mode, a data storage medium (hereinafter simply referred to as "medium") starts or stops its rotation with a magnetic head being in contact with the medium and, in the HLU mode, the medium starts or stops its rotation with the magnetic head being separated from the medium.

(2) Description of the Related Art

The increased demand in recent years for higher capacity necessitates the reduction in the flying-height of the magnetic head from the medium and this, coupled with an improvement in a profile irregularity of the medium, presents a potential problem of unintentional contact or adhesion between the magnetic head and the medium. In utilizing the magnetic disk drive apparatus in a recent laptop type computer, it is required that power consumption be kept low since such a computer is typically battery-powered and that, in order to meet such requirement, a semi-stop mode be employed whereby the parts, excepting the minimum necessary functional elements but including those associated with the medium, are stopped during the non-access period. Also, the magnetic disk drive apparatus for such a computer is required to have high shock-proof characteristics because of its portable nature.

In view of the above, there have existed two kinds of conventional magnetic disk drive apparatus in terms of the modes they utilized. The first kind is one in which both the structure at the side of the drive mechanism including the magnetic head itself and the structure at the side of the medium are improved whereby the CSS mode is used to achieve the reliable performance. The other kind is one which is a more positive method and in which, during both the stopped state and the semi-stopped state of the magnetic disk drive apparatus, a loading/unloading mechanism is utilized and the magnetic head is allowed to be separated from the medium in HLU mode resulting in the achievement of the reliable performance.

In the first kind in which the characteristics at the side of the magnetic head and at the side of the medium are improved and the CSS mode is used, there is a limit in the use of the semi-stop mode because of the large number of slidings which occur when the semi-stop mode is used to stop the rotation of the medium during the non-access period in order to reduce power consumption.

In the second kind in which the HLU mode is used for separating the magnetic head from the medium, although this is ideal when the semi-stop mode is used, there is a problem in that it will be very difficult to reliably perform the HLU mode operation in case the interruption of power suddenly occurs.

SUMMARY OF THE INVENTION

It is, therefore, an object of the present invention to overcome the problems existing in the conventional arrangement and to provide an improved magnetic disk drive apparatus in which both the HLU mode performance and the CSS mode performance are combined, the HLU mode being for starting/stopping the medium by separating the magnetic head from the medium and the CSS mode being for starting/stopping the medium while the magnetic head is in contact with the medium.

It is another object of the present invention to provide a magnetic disk drive apparatus which repeats high frequency starting/stopping operations and in which the life is long and the performance is reliable.

According to one aspect of the invention, there is provided a magnetic disk drive apparatus comprising:

a data storage medium which is rotated by a drive means;

a magnetic head which writes and reads information on and from the data storage medium;

a positioning means including an arm assembly which performs positioning of the magnetic head at target positions on the data storage medium; and a magnetic head retract means which, when the data storage medium starts or stops its rotation, makes use of a first start/stop mode wherein the data storage medium is caused to be started or stopped while the magnetic head is separated from the data storage medium, and also makes use, in combination therewith, of a second start/stop mode wherein the data storage medium is caused to be started or stopped while the magnetic head slides on the data storage medium.

According to the present invention, the HLU mode is used either as a main mode or an auxiliary mode, in combination with the CSS mode, and this makes it possible to avoid the problems stemmed from the repeated starts/stops of the medium necessitated by the employment of the semi-stop mode and also makes it possible to reduce the power consumed during the starting of the medium. The improvements thus achieved meet the characteristics or capability required by recent laptop type computers. The most difficult problem experienced in the HLU mode is that encountered when the power supply is suddenly interrupted, but the present invention overcomes such problem by use of the CSS mode and remarkably enhances the reliability of the device.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the accompanying drawings.

Figure 1:
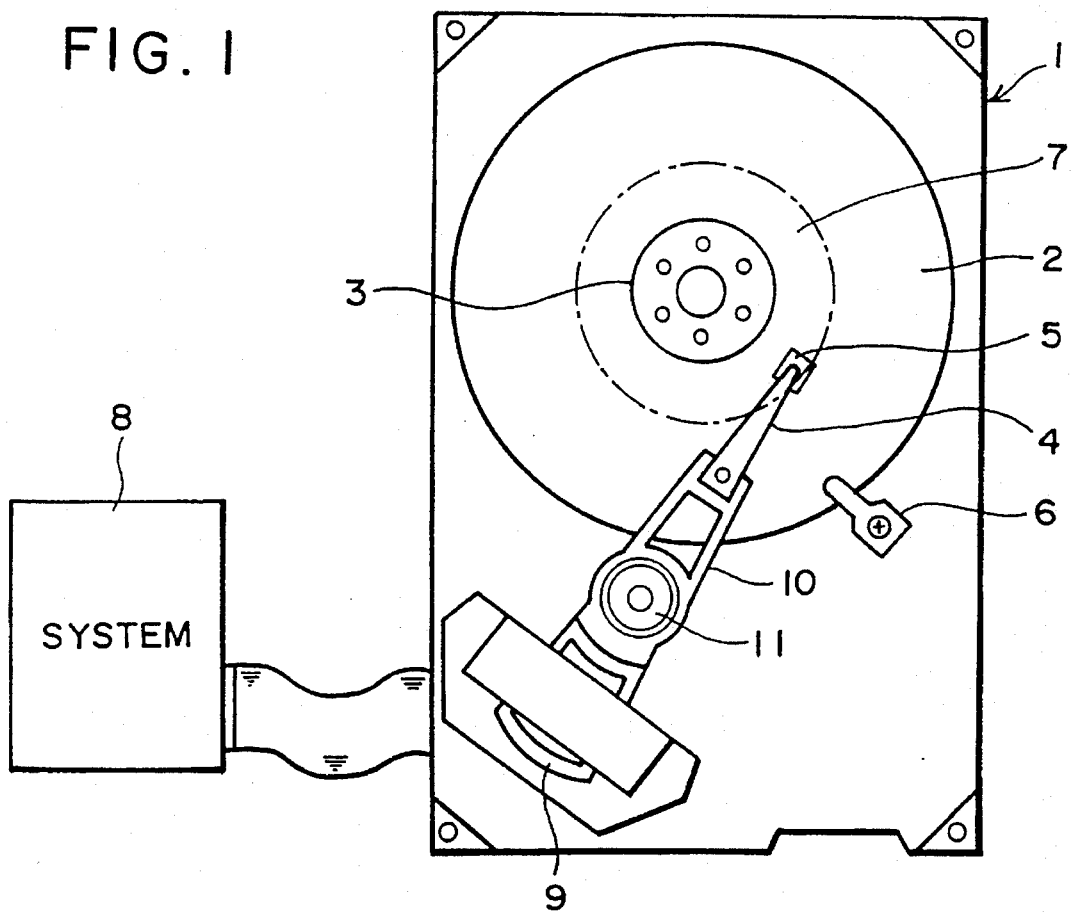
FIG. 1 is a top plan view of the magnetic disk drive apparatus of the present invention.

FIG. 1 shows in top plan view the schematic diagram of the apparatus according to the invention. As seen therein, the magnetic disk drive apparatus 1 includes a data storage medium 2, a spin motor 3 for rotating the medium 2, a magnetic head 5 carried by a suspension arm 4 which in turn is carried by an arm assembly 10, and a lifter 6 which separates the magnetic head 5 from the surface of the medium 2. The arm assembly 10 includes a voice coil motor (hereinafter abbreviated as "VCM") 9 for driving the magnetic head 5 and a retract magnet means 11 for causing the magnetic head 5 to move and stop on the medium 2 when the medium stops rotating.

The medium 2 is provided with a CSS zone 7 in which the magnetic head 5 slides and stops. The magnetic disk drive apparatus 1 is connected to a system 8 thereby serving a system 8 to store or supply data.

Now, the operation of the magnetic disk drive apparatus of the embodiments will be explained.

Figure 2A:
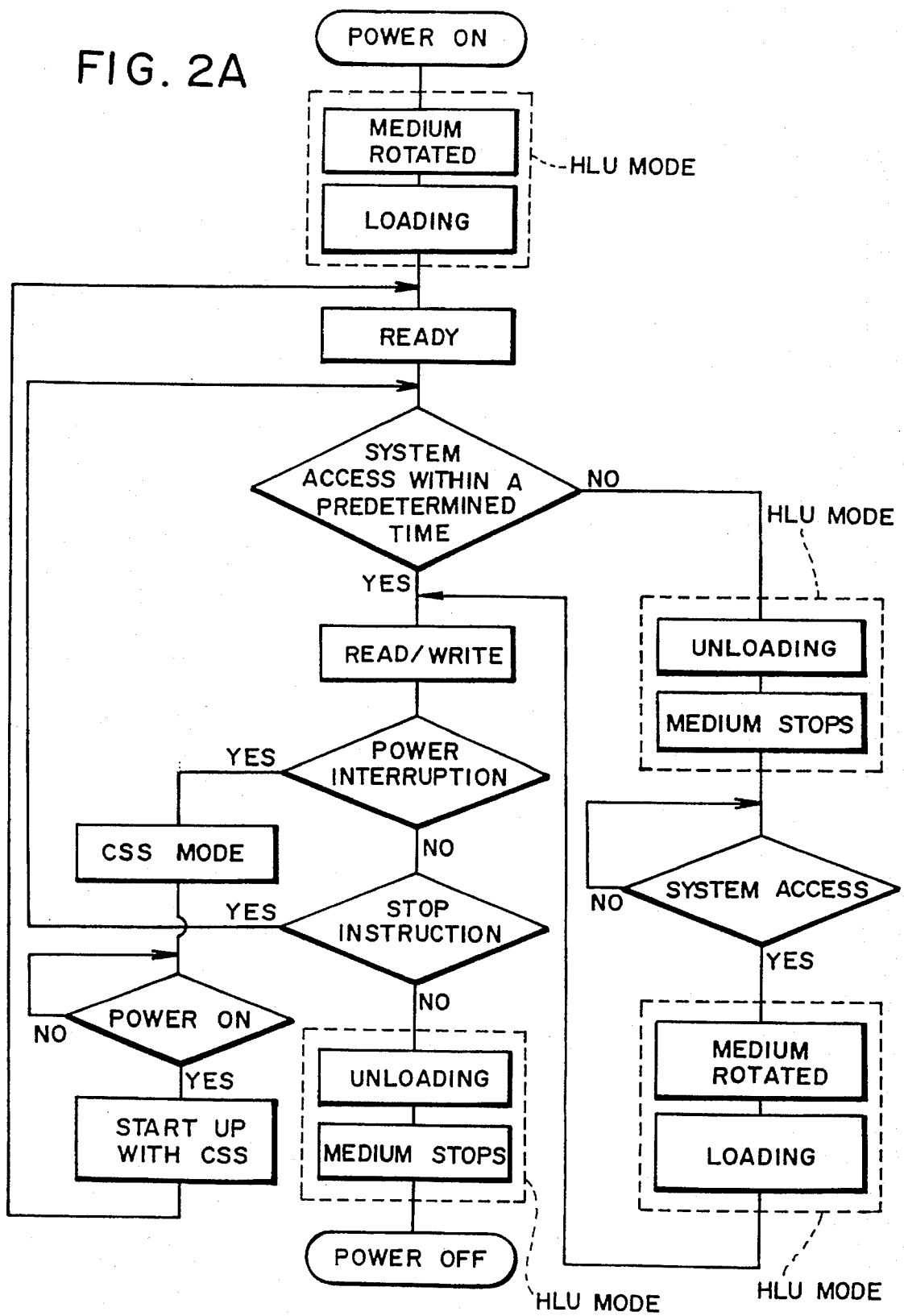
FIGS. 2A and 2B are flow charts of operations of the magnetic disk drive apparatus according to the invention, FIG. 2A showing the operation in which the HLU mode is used as the main mode and FIG. 2B showing the operation in which the CSS mode is used as the main mode

FIG. 2A shows in a flow chart the sequential flow of operations according to the first embodiment of the invention.

FIG. 2A covers mainly the operation under the HLU mode. The operation under the CSS mode is in combination with the HLU mode but the former is only as an auxiliary mode, that is, the CSS mode comes into play only when an unexpected condition such as sudden power supply interruption takes place. In this embodiment, when the device is not operating, the magnetic head 5 is basically in a state in which it is separated by the lifter 8 from the surface of the medium 2 in the HLU mode.

First, when the power is switched ON, the magnetic disk drive apparatus 1 is set to a ready state. At this time, the magnetic head 5 is first loaded on the medium 2 in order to check whether the magnetic disk drive apparatus 1 is in a completely operable state and, if there is no access from the system 8, the device turns to its semi-stop state by the HLU mode and waits for an access from the system 8. The above is a general method. However, if the power saving is in a high priority, an alternative method may be only to await an access from the system 8 without checking whether the magnetic disk drive apparatus is in an operable state.

Subsequently, every time there is an access from the system 8, the magnetic head 5 is loaded on the medium 2 after the medium is caused to rotate and then the writing or reading of data is performed. If there is no access from the system 8 within a predetermined time period, the magnetic head 5 is unloaded and separated from the medium 2 by the lifter 6 and, thereafter, the rotation of the medium 2 is stopped, and the device is turned to the semi-stop mode.

The above operations are repeated until a stop instruction from the system 8 is received by the magnetic disk drive apparatus 1. Where the stop instruction is issued to the magnetic disk drive apparatus 1 from the system 8, the magnetic head 5 is separated from the medium 2 by the lifter 6 and then the magnetic disk drive apparatus 1 is completely stopped.

In the configuration of this first embodiment, if the power supply interruption occurs while the magnetic head 5 is in an area over the medium 2, the magnetic disk drive apparatus 1 loses a source of power for separating the magnetic head 5 from the area over the medium 2. In a situation like this, the prior art arrangement has utilized as an emergency source of power a back electromotive force (emf) of the spin motor 3. However, the back electromotive force thus generated is weak and insufficient so that the magnetic head 5 may be left on the medium 2, which means that there is a potential risk of the occurrence of adhesion between the magnetic head 5 and the medium 2.

In the magnetic disk drive apparatus according to the invention, it should be noted that the medium 2 is provided with the CSS zone 7 which is able to endure to contact start/stop of the magnetic head 5 and by which a possibility of accidental adhesion can be avoided. In the magnetic disk drive apparatus which operates mainly in the HLU mode, since the CSS mode is used only when the power supply is suddenly interrupted, the requirements concerning the endurance to contact start/stop are less severe as compared with those in the prior art device relying solely on the CSS system, and this facilitates increasing the capacity of the medium. Also, since the CSS mode is not used at all under the normal operations, the CSS endurance problem that the prior art device has encountered when the semi-stop mode is used is no longer the case in the device according to the invention.

Figure 2B:
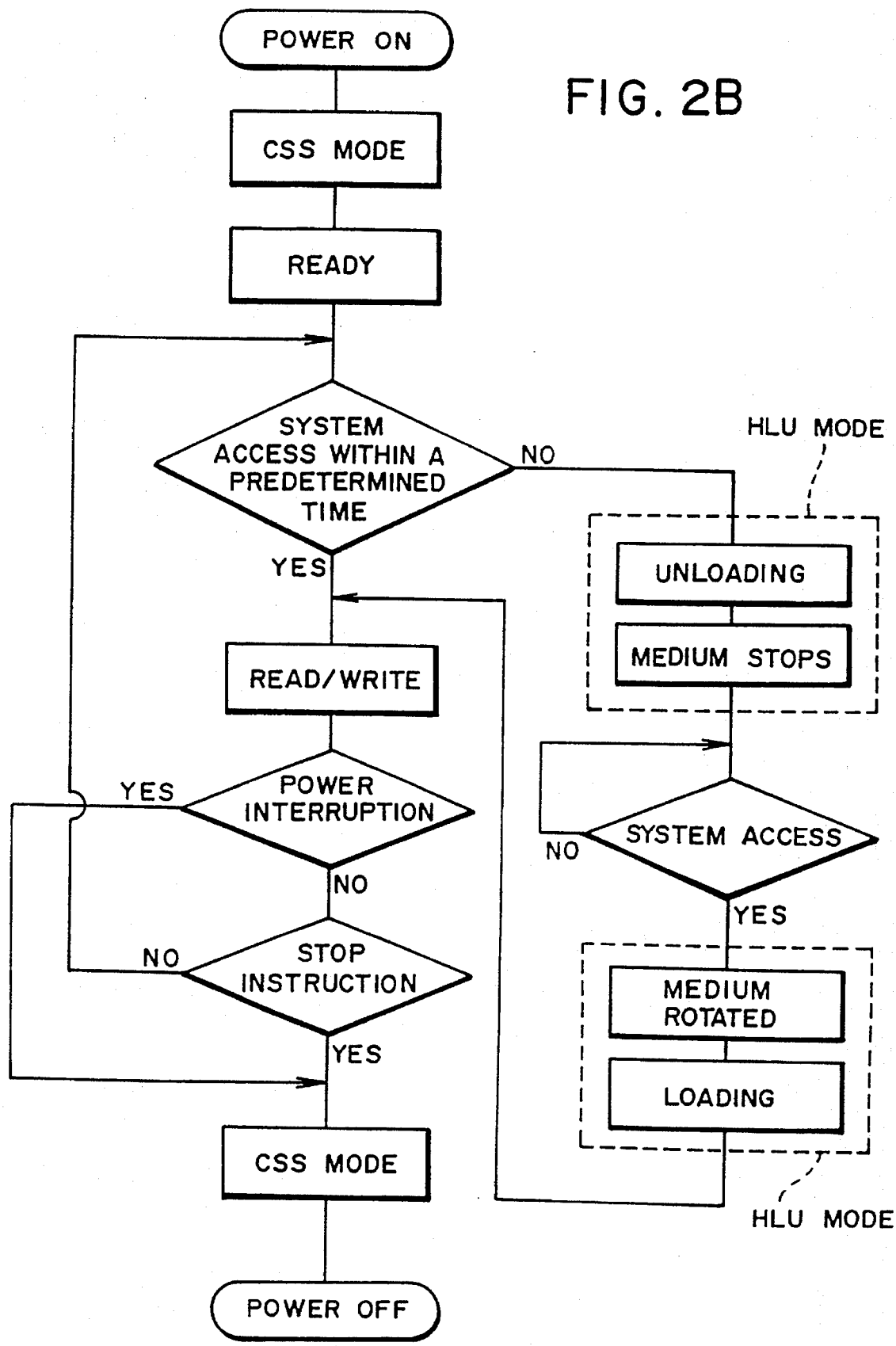

Next, FIG. 2B shows in a flow chart the sequential flow of operations according to the second embodiment of the invention.

FIG. 2B covers mainly the operation under CSS mode. The HLU mode is combined to the CSS mode as an auxiliary mode in order to achieve low power consumption under a semi-stop state. In this embodiment, basically the magnetic head 5 slides and stops on the medium 2 by the CSS mode under the non-operative state.

The flow chart of FIG. 2B is different from that of FIG. 2A in the point that, when the power supply is turned ON, the magnetic disk drive apparatus 1 has already been in the state in which the magnetic head 5 is stopped on the CSS zone 7. From this state, the medium 2 is caused to be rotated and to be in the ready state. Subsequently, if there is no access from the system 8 within a predetermined time period, the magnetic head 5 is separated from the medium 2 onto the lifter 6. The subsequent semi-stop mode operation is exactly the same as that according to the flow chart of FIG. 2A.

The operation according to the flow chart of FIG. 2B is such that the CSS mode is used mainly and the HLU mode is used only for lowering power consumption by a semi-stop mode. This is contrasted to the operation according to the flow chart of FIG. 2A in which basically the HLU mode is used and the CSS mode is used only as an auxiliary mode in case the power supply is suddenly interrupted. Thus, not only at the sudden interruption of power supply but also under the non-operative state of the magnetic disk drive apparatus 1, the magnetic head 5 is positively brought to and stopped at the CSS zone 7 on the medium 2. Here, as compared with the case wherein the CSS mode is used only to realize the semi-stop mode, the number of slidings of the magnetic head 5 on the medium 2 is dramatically reduced and this is a significant advantage for ensuring a longer life of the device.

How the CSS mode is performed is explained hereunder.

Figure 3:
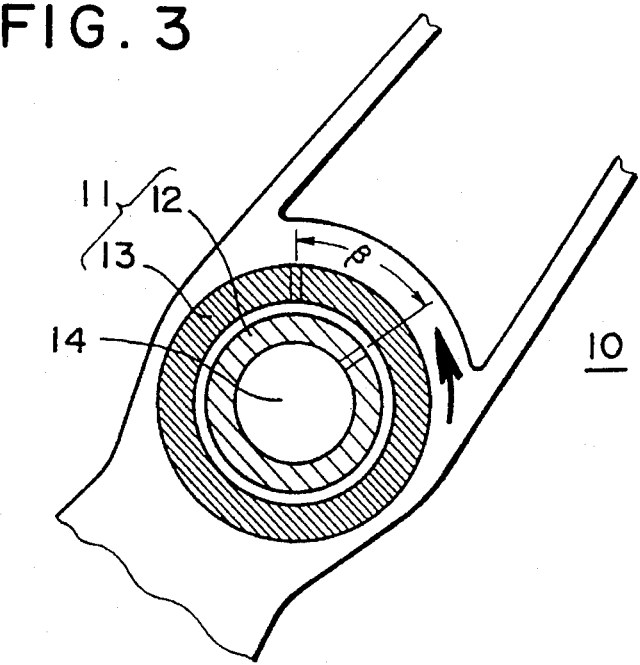
FIG. 3 is an enlarged top view of the retract magnet means for causing the magnetic head to be stopped on the medium and be held in the CSS zone.

According to the embodiments of the invention, the retract magnet 11 generates a force urging the magnet head 5 to be held at the CSS zone 7. As seen in FIG. 8 which is an enlarged diagram of the retract magnet means 11 shown in FIG. 1, the retract magnet means 11 is formed by an inner magnet ring 12 fixed to a stationary axis 14 and an outer magnet ring 13 rotatable with respect to the inner magnet ring 12. These magnet rings are magnetized in a diametrical direction with the magnetizing angle being a phase difference of $\beta$ (the outer magnet ring 13 displaced $0$–$2\pi$ counterclockwise with respect to the inner magnet ring 12). Due to this phase difference of β, the retract magnet means 11 generates a torque shown in FIG. 3 by a thick arrow, in seeking the magnetic equilibrium.

When the power supply is OFF, the magnetic head 5 is stopped and held in the CSS zone 7 on the medium 2. The retract torque from the retract magnet 11 acts in the direction in which the magnetic head 5 is held in the CSS zone 7. The medium 2 is rotated from this state for the device to be in a ready state. Even under the read/write state, the retract torque from the retract magnet 11 is constantly acting on the magnetic head 5 urging it to be restored or retracted to the CSS zone 7. This is without a problem because the torque for positioning the magnetic head 5 generated by the VCM 9 is greater than above retract torque. When there is no access from the system 8, the VCM 9 causes the magnetic head 5 to move outwardly by overcoming the retract torque from the retract magnet means 11 and the magnetic head 5 is separated (unloading) onto the lifter 6. When there is an access from the system 8, the VCM 9 causes the magnetic head 5 to move inwardly and the magnet head 5 is brought (loading) to the area over the medium 2.

When the power supply is accidentally cut or when the device is not in an operative state, the control for the positioning of the magnetic head 5 is lost. Under this state, the medium 2 is still rotating by inertia and the magnetic head 5 is still in a floating state. Once the control for the positioning of the magnetic head 5 ceases, a reaction force against the constant retract torque also ceases so that, due to the retract torque, the magnetic head 5 automatically moves to the CSS zone 7 and is held there. In this state, since the rotation of the medium 2 slows down and stops, the magnetic head 5 is no longer in its floating state and turns to its CSS state.

According to the embodiments of the invention, the HLU mode is effected by the operation and control of the VCM 9 and the CSS mode is effected by the ceasing of the positioning control of the magnetic head 5 and the stoppage of the medium 2. The latter operation takes place automatically when the power supply is turned OFF so that no controlling means is required therefor.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A magnetic disk drive apparatus comprising:
   a data storage medium which is rotated by a drive means;
   a magnetic head which writes and reads information on and from said data storage medium;
   a positioning means including an arm assembly which performs positioning of said magnetic head at target positions on said data storage medium; and
   a magnetic head securing means comprising:
     a first start/stop means for starting and stopping said data storage medium while said magnetic head is separated from said data storage medium;
     a second start/stop means for starting and stopping said data storage medium while said magnetic head is in contact with said data storage medium; and
     means for selecting and utilizing one of said first start/stop means and said second start/stop means based on a current state of said disk drive apparatus.

2. A magnetic disk drive apparatus according to claim 1, in which said second start/stop means is used only during power supply interruption.

3. A magnetic disk drive apparatus according to claim 1, in which said first start/stop means in used only during periods of non-access.

4. A magnetic disk drive apparatus of claim 1 wherein said first start/stop means operates in HLU mode and said second start/stop mode operates in CSS mode.

5. A magnetic disk drive apparatus comprising:
   a data storage medium which is rotated by a drive means;
   a magnetic head which writes and reads information on and from said date storage medium;
   a positioning means including an arm assembly which performs positioning of said magnetic head at target positions on said data storage medium, said arm assembly including a voice coil motor for driving said magnetic head; and
   a magnetic head securing means comprising:
     a first start/stop means for starting and stopping said data storage medium while said magnetic head is separated from said data storage medium, said first start/stop means having a lifter for withdrawing said magnetic head form an area over said late storage medium;
     a second start/stop means for starting and stopping said data storage medium while said magnetic head is in contact with said data storage medium, said second start/stop means having a means for constantly urging said magnetic head towards a contact start/stop zone on said data storage medium; and
     means for utilizing one of said first start/stop means and said second start/stop means based on a current state of said disk drive apparatus.

6. A magnetic disk drive apparatus according to claim 5, wherein said means for constantly urging moves said magnetic head to and holds said magnetic head at said contact start/stop zone only when power supply is suddenly interrupted.

7. A magnetic disk drive apparatus according to claim 5, in which said voice coil motor has a torque greater than a retract torque of said means for constantly urging, whereby said magnetic head is unloaded onto said lifter by the torque of said voice coil motor with said torque overcoming the retract torque of said means for constantly urging and said second start/stop means restores said magnetic head to said contact start/stop zone when the apparatus is not operating or power supply is suddenly interrupted.

8. A method for driving a magnetic disk drive apparatus, said disk drive apparatus being connected to a system and having a magnetic head, and a storage medium with a start/stop zone, said method comprising the steps of:
   setting said magnetic disk drive apparatus to a ready state, wherein;
   said magnetic head is loaded on said storage medium so as to be ready to perform read/write operations;
   unloading and separating said magnetic head from said storage medium and stopping rotation of said storage medium if there is no access from the system within a predetermined time period;
   unloading and separating said magnetic head from said storage medium and stopping said magnetic disk drive apparatus in response to a stop instruction while said magnetic head is performing a read write operation; and
   positioning and holding said magnetic head in contact with said start/stop zone when a power supply interruption is received while said magnetic head is performing a read/write operation.

9. A method for driving a magnetic disk drive apparatus, said disk drive apparatus being connected to a system and having a magnetic head, and a storage medium with a start/stop zone, said method comprising the steps of:

positioning said magnetic head in said start/stop zone when said apparatus is turned off;

turning said apparatus on with said magnetic head remaining in said start/stop zone;

setting said magnetic disk drive apparatus to a ready state;

unloading and separating said magnetic head from said storage medium and stopping rotation of said storage medium if there is no access from the system within a predetermined time period;

positioning said magnetic head in said start/stop zone when a stop instruction is received while said magnetic head is performing a read write operation; and positioning and holding holding said magnetic head in contact with said start/stop zone when a power supply interruption is received while said magnetic head is performing a read/write operation.

* * * * *